United States Patent
Bixel et al.

(10) Patent No.: US 6,329,776 B1
(45) Date of Patent: Dec. 11, 2001

(54) METHOD AND APPARATUS FOR SWITCHING AN AC MACHINE BETWEEN A DRIVE AND A POWER SUPPLY

(75) Inventors: Paul S. Bixel, Salem; Eddy Y. Y. Ho, Roanoke, both of VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/455,395

(22) Filed: Dec. 6, 1999

(51) Int. Cl.$^7$ .................................................. H02P 1/46
(52) U.S. Cl. ........................ 318/431; 318/500; 318/705
(58) Field of Search .................................. 318/430, 431, 318/700, 705, 709, 710, 711, 712, 713, 715, 500

(56) References Cited

U.S. PATENT DOCUMENTS

| | | | |
|---|---|---|---|
| 3,100,279 | * 8/1963 | Rohner | 318/167 |
| 3,887,820 | 6/1975 | Glennon | 318/709 |
| 4,012,679 | * 3/1977 | Matsuda et al. | 318/713 |
| 4,587,474 | 5/1986 | Espelage et al. | 307/87 |
| 5,148,093 | * 9/1992 | Bando et al. | 318/723 |

FOREIGN PATENT DOCUMENTS

| | | | |
|---|---|---|---|
| 31 13 564 A | 11/1982 | (DE) | H02P/7/42 |
| 37 27 696 A | 3/1989 | (DE) | H02P/1/26 |
| 42 04 677 | 6/1993 | (DE) | H02P/7/63 |
| 2 718 581 A | 10/1995 | (FR) | H02P/1/46 |

OTHER PUBLICATIONS

Patent Abstracts of Japan, vol. 1999, No. 12, Oct. 29, 1999 & JP 11 178377 A (Nishishiba Electric Co Ltd) Jul. 2, 1999—abstract.

* cited by examiner

Primary Examiner—Bentsu Ro
(74) Attorney, Agent, or Firm—Hunton & Williams; Carl B. Horton, Esq.; Kevin T. Duncan, Esq.

(57) ABSTRACT

A method and apparatus for transferring an AC machine between non volts per hertz drive and a power supply such as supply mains, or a generator. In a transfer procedure, the motor drive is placed in a quasi-voltage mode prior to transfer to permit the output of the motor drive to be synchronized to the output of the power supply. In capture procedure, the output of the drive is preconditioned based on detected states of the AC machine to synchronize the voltage at the terminals of the AC machine with the output of the drive. During the capture procedure, opening of a contactor is detected by comparing the frequency and/or voltage at the terminals of the AC machine with that of the power supply.

44 Claims, 7 Drawing Sheets

METHOD AND APPARATUS FOR SWITCHING AN AC MACHINE BETWEEN A DRIVE AND A POWER SUPPLY

BACKGROUND OF THE INVENTION

The invention relates to controlling transfer of an AC machine between power from a power supply and power from a variable frequency drive. More specifically, the invention is a method and apparatus for transferring an AC machine between power from a power supply and power from a drive that does not use a volts per hertz control scheme.

In many applications, it is desirable to transfer an AC machine receiving power a power supply, such as supply mains, to receive power from a variable frequency motor drive, or vice versa. The phrase "power supply", as used herein, refers to any source of AC electric power such as supply mains, a generator, an uninterruptable power supply, or the like. The phrase "AC machine", as used herein, refers to any AC rotating machine, such as AC synchronous motors, AC reluctance motors, generators, dynamos, or the like.

For example, in gas turbine static starters, a variable frequency motor drive is used in place of a diesel engine to bring a generator up to a self-sustaining speed at which the generator can subsequently be switched to supply mains. In other applications, such as variable speed fans and pumps, it is desirable to achieve variable speed with a motor drive and subsequently switch the motor to supply mains for sustained operation at a constant high speed. Also, in the event of failure of the motor drive, it is desirable to transfer the motor to the supply mains to continue operation. Similarly, it is often desirable to switch a motor back from supply mains to a motor drive for slowing the motor down or otherwise varying the speed or torque of the motor. Switching of an AC machine from a drive to a power supply is referred to as "transfer" herein and switching of an AC machine from a power supply to a drive is referred to as a "capture" herein.

Of course, AC machine speed varies with frequency of the input signal driving the motor. However, the inductive reactance of the motor drops at low frequencies, resulting in excess current in the motor if voltage is constant. Therefore, conventional V/F ("volts per frequency" or "volts per hertz") drive control, utilizes a fixed ratio between the drive voltage and frequency and the frequency is controlled under this assumption, up to a nominal operating frequency, to control the speed of a motor driven by the drive output. In V/F control drives, it is relatively simple to synchronize the frequency of the drive output and a power supply to accomplish transfer and capture. However, V/F control is open loop in nature and thus has inherent stability problems. For example, since the frequency is controlled, the machine speed is not controlled directly. Machine slip occurs depending on the load and thus motor speed is not directly proportional to frequency of the input current. Complex slip frequency algorithms have been developed to overcome this problem. However, in addition to the added complexity of slip frequency control, V/F control does not separately control the field producing and the torque producing components of the input current and thus instantaneous torque control cannot be achieved.

"Vector control" drives have been developed to overcome limitations of V/F control drives. The phrase "vector control", as used herein, refers to any type of AC machine torque control such as field orientation, natural field orientation control, and direct torque control. In vector control drives, torque in the motor is controlled directly or indirectly. Accordingly, vector control allows an AC machine to be controlled in a manner similar to a DC machine. Vector control algorithms are well known and vector control drives are used in various DC machine control applications. However, since vector control inherently does not provide a reference voltage, it is difficult to synchronize the output of a vector control drive with that of supply mains and thus it is difficult to implement line transfer or capture procedures in systems having vector control drives.

BRIEF SUMMARY OF THE INVENTION

A first aspect of the invention is a method for switching an AC machine between power from a power supply and power from a drive comprising the steps of, coupling the output of a drive to an AC machine, controlling the speed of the AC machine with the output of the drive utilizing a control procedure other than a volts per hertz control procedure, freezing voltage and frequency output by the drive at a transfer voltage value and transfer frequency value, controlling the output of the drive in accordance with a quasi-voltage mode using the transfer voltage value and the transfer frequency value as a reference, synchronizing the output of the drive and the output of a power supply after said controlling step, coupling the power supply to the AC machine after said synchronizing step, and removing the output of the drive from the AC machine.

A second aspect of the invention is a method for switching an AC machine between power from a power supply and power from a drive comprising coupling an output of a power supply to an AC machine to drive the AC machine with the output of the power supply, coupling an output of a drive to the AC machine with the drive in an idle state, uncoupling the output of the power supply from the AC machine, detecting operating states of the AC machine, preconditioning the output of the drive to correspond to the operating states detected in said detecting step, and controlling the output of the drive based on said preconditioning step.

A third aspect of the invention is an apparatus for switching an AC machine between power from a power supply and power from a motor drive comprising means for coupling the output of a drive to an AC machine, means for controlling the speed of the AC machine with the output of the drive utilizing a control procedure other than a volts per hertz control procedure, means for freezing voltage and frequency output by the drive at a transfer voltage value and transfer frequency value, means for controlling the output of the drive in accordance with a quasi-voltage mode using the transfer voltage value and the transfer frequency values as a reference, means for synchronizing the output of the drive and the output of a power supply, means for coupling the power supply to the AC machine after said means for synchronizing has synchronized the output of the drive and the output of the power supply, and means for removing the output of the drive from the AC machine after said means for coupling has coupled the power supply to the AC machine.

A fourth aspect of the invention is an apparatus for switching an AC machine between power from a power supply and power from a drive comprising means for coupling an output of a power supply to an AC machine to drive the AC machine with the output of the power supply, means for coupling an output of a drive to the AC machine with the drive in an idle state, means for uncoupling the output of the power supply from the AC machine, means for detecting operating states of the AC machine, means for preconditioning the output of the drive to correspond to the operating states detected by said means for detecting, and means for controlling the output of the drive based on an output of said means for preconditioning.

A fifth aspect of the invention is a method for detecting opening of a switch mechanism in a drive systems having a power supply coupled to a drive to provide power to the drive, a first switch mechanism coupled to an output section of the drive, a second switch mechanism coupled to the power supply, an AC machine coupled to the first switch mechanism and the second switch mechanism, and a controller operatively coupled to the first switch mechanism and the second switch mechanism to control to the first switch mechanism and the second switch mechanism to selectively couple the AC machine to the utility and the output section of the drive. The method comprises detecting frequency at terminals of the AC machine, and generating a signal indicating the second switch mechanism is open based on the frequency at terminals of the AC machine.

A sixth aspect of the invention comprises a switching system for switching an AC machine between power from a power supply and power from a drive comprising, a power supply, a drive having an output section and an input section, said input section being coupled to said power supply, a first switch mechanism coupled to said output section, a second switch mechanism coupled to said power supply, an AC machine coupled to said first switch mechanism and said second switch mechanism, and a controller operatively coupled to said first switch mechanism and said second switch mechanism to control to said first switch mechanism and said second switch mechanism to selectively couple the AC machine to said power supply and the output section of the drive, said controller being operative to control the speed of the AC machine with the output of the drive when the first switch mechanism is closed and said second switch mechanism is open utilizing a control procedure other than a volts per hertz control procedure, to freeze the voltage and frequency output by said drive at a transfer voltage value and transfer frequency value, said controller also being operative to control the output of said drive in accordance with a quasi-voltage mode using the transfer voltage value and the transfer frequency as a reference during a transfer procedure to facilitate synchronizing the output of said drive and the output of said power supply, to close the second switch mechanism to couple said power supply to said AC machine after the output of said drive and the output of said power supply have been synchronized, and to subsequently remove the output of said drive from said AC machine.

A seventh aspect of the invention is a switching system for switching an AC machine between power from a power supply and power from a drive comprising a power supply, a drive having an output section and an input section, said input section being coupled to said power supply, a first switch mechanism coupled to said output section, a second switch mechanism coupled to said power supply, an AC machine coupled to said first switch mechanism and said second switch mechanism, and a controller operatively coupled to said first switch mechanism and said second switch mechanism to control to said first switch mechanism and said second switch mechanism to selectively couple said AC machine to said power supply and said output section of said drive, said controller being operative to close said second switch mechanism to couple an output of said power supply to the AC machine to drive said AC machine with the output of said power supply and close said first switch mechanism to couple an output of said drive to said AC machine with said drive in an idle state, said controller also being operative to open said second switch mechanism to uncouple the output of said power supply from said AC machine, to detect operating states of said AC machine, to precondition the output of said drive to correspond to the detected operating states and to control the output of said drive based on the preconditioning.

BRIEF DESCRIPTION OF THE DRAWINGS

The invention is described herein through a preferred embodiment and the drawing in which.

DETAILED DESCRIPTION OF THE INVENTION

Figure 1:
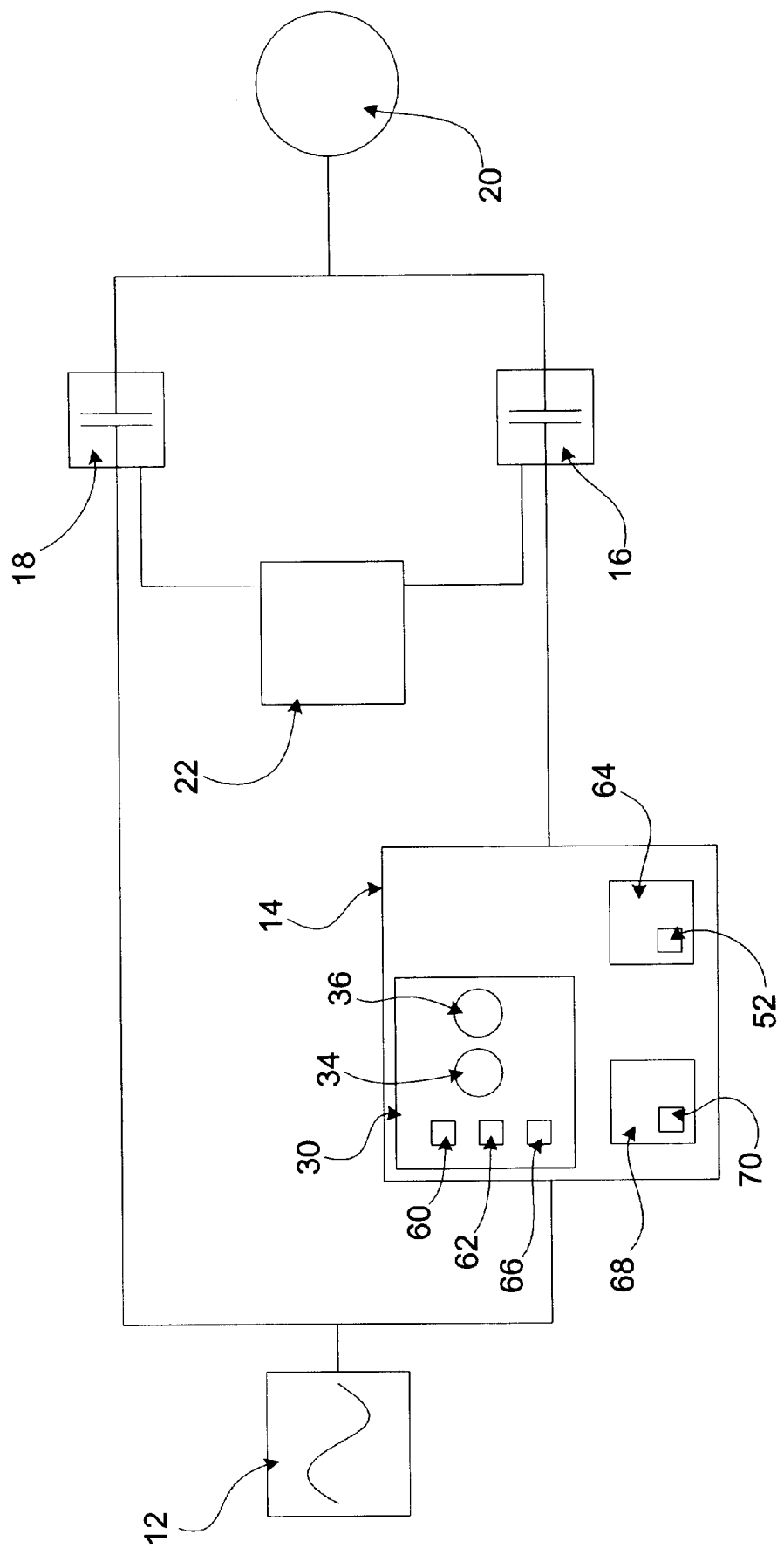
FIG. 1 is a block diagram of a switching system in accordance with a preferred embodiment.

FIG. 1 illustrates power transfer system 10 in accordance with a preferred embodiment. System 10 includes supply mains 12, a source of three phase AC power at frequency f, motor drive 14, a vector controlled variable frequency AC drive, drive output contactor 16 (serving as a switching mechanism), utility contactor 18 (also serving as a switching mechanism), and motor 20. It can be seen that operation of contactors 18 and 16 can be controlled to selectively couple motor 20 to supply mains 12, to motor drive 14, or to both. Controller 22 is operatively coupled to contactors 16 and 18 to control the state of contactors 16 and 18 in a desired manner. Controller 22 can be a microprocessor based device programmed in a desired manner, a hardwired analog logic circuit, or any other mechanism for controlling contactors 16 and 18 in the manner described below.

Motor drive 14 includes drive controller 30 having a memory including instructions for a vector control algorithm for controlling the torque of motor 20 in accordance with known vector control techniques. Controller 30 also includes quasi-voltage module 34 which includes an algorithm for controlling motor 20 in a voltage follower manner. Quasi-voltage module 34 is described as a separate element herein for clarity, can be constituted of instructions providing the quasi-voltage control mode described below and need not include separate hardware or software. Motor drive 20 also includes output section 64 having switching bridges controlled by controller 30 for generating an output signal for driving motor 20 in a known manner. Output section 64 includes motor flux phase locked loop (PLL) 52 as is well known. Motor drive 20 also includes input section 68 having line PLL 70. Controller 22 and controller 30 are illustrated as separate elements for clarity. However, one controller can be used to accomplish the function of both.

Figure 2:
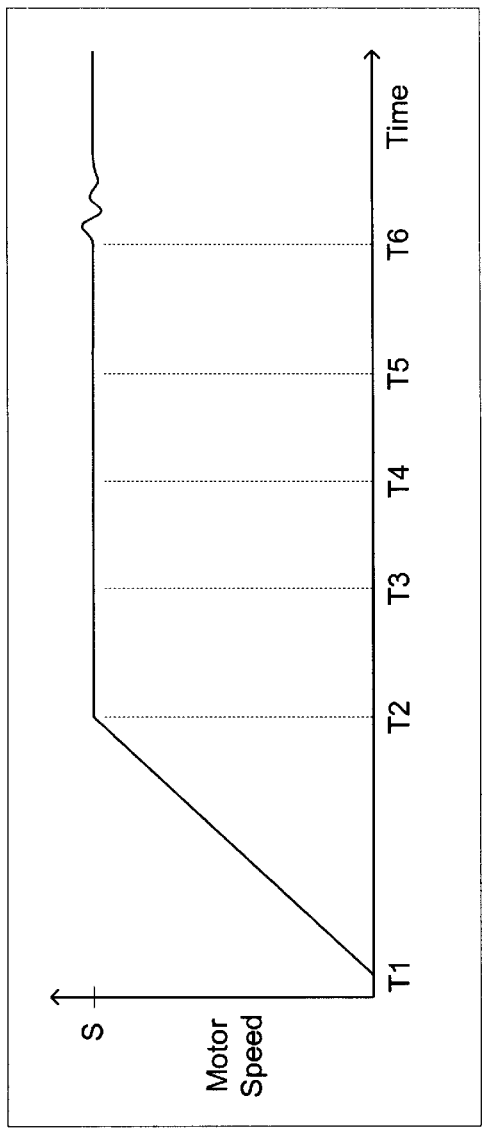
FIG. 2 is a graph of motor speed versus time in a transfer procedure.
Figure 3:
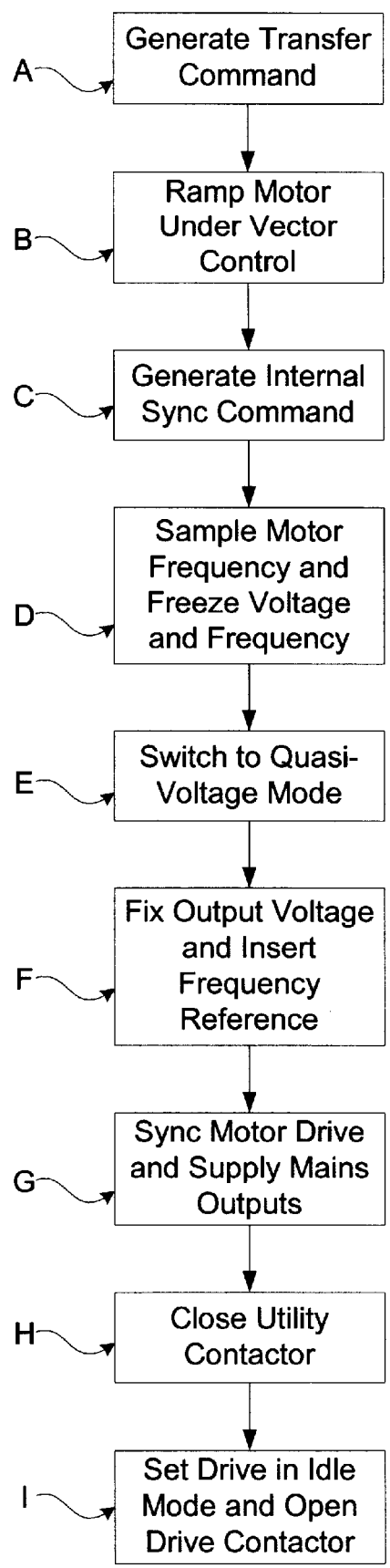
FIG. 3 is a flowchart of a transfer procedure.

FIG. 2 is a graph of motor speed versus time in the transfer procedure of the preferred embodiment and FIG. 3 is a flowchart of the transfer procedure of the preferred embodiment. With contactor 18 open and contactor 16 closed to allow motor 20 to be controlled by the output of motor drive 14, in step A, at time T1, a transfer command is generated by controller 22. In step B, motor 20 is ramped up to speed by motor drive 14, under vector control of drive controller 30, until motor 20 reaches steady state speed S at time T2. Shortly thereafter, at time T3, controller 30 generates an internal synchronize command in step C to indicate that a switch should be made to the quasi-voltage control mode. In response to the internal synchronize command, in step D, the motor frequency is sampled using existing electronics in power converter 14 and the voltage and frequency at the output of motor drive 14 are frozen, i.e. maintained at the last value prior to synchronization, at time T4. In step E, controller 30 switches to the quasi-voltage control mode under control of quasi-voltage module 34. The output voltage and frequency of drive 14 are fixed and become the reference in the quasi-voltage mode.

At time T5, the phase and magnitude, i.e. voltage, of output signals from supply mains 12 and motor drive 14 are matched, i.e. synchronized, in a known manner, in step G, while motor drive 14 is in the quasi-voltage control mode. In particular, the output frequency motor drive 14 will be ramped, i.e. trimmed, to place the output of motor drive 14 in phase with utility 12. Because the quasi-voltage control mode uses a voltage follower algorithm, phase and voltage matching is easily accomplished by phase and voltage regulators. Also, this mode can be insensitive to load disturbances. At time T6, controller 22 closes contactor 18 in step H. Subsequently, in step I. Controller 30 places motor drive 14 in an idle mode, i.e. a state in which no output signal is generated by output section 64 and then controller 22 opens contactor 16 to complete the transfer procedure and allow motor 20 to be powered by supply mains 12.

Figure 4:
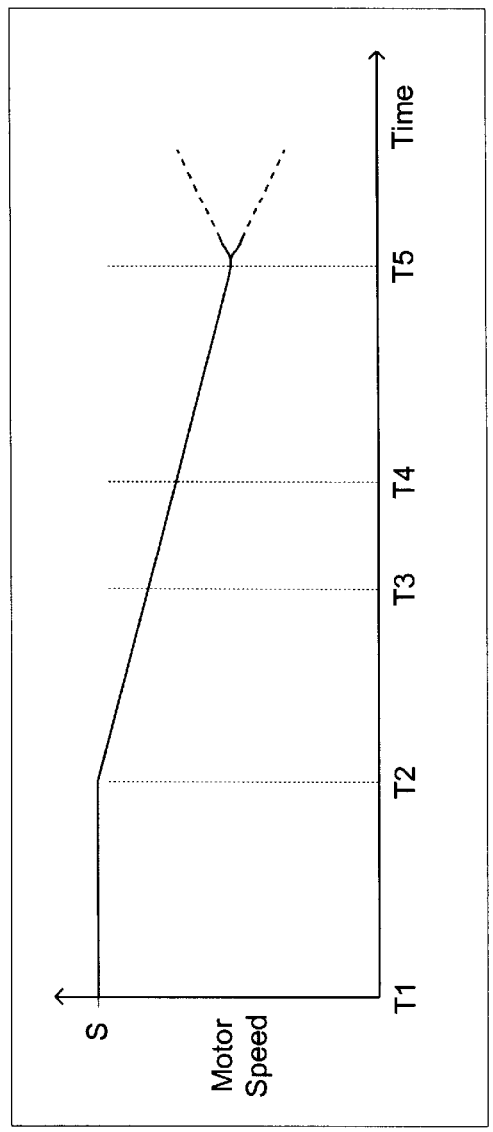
FIG. 4 is a graph of motor speed versus time during a capture procedure of the preferred embodiment.
Figure 5:
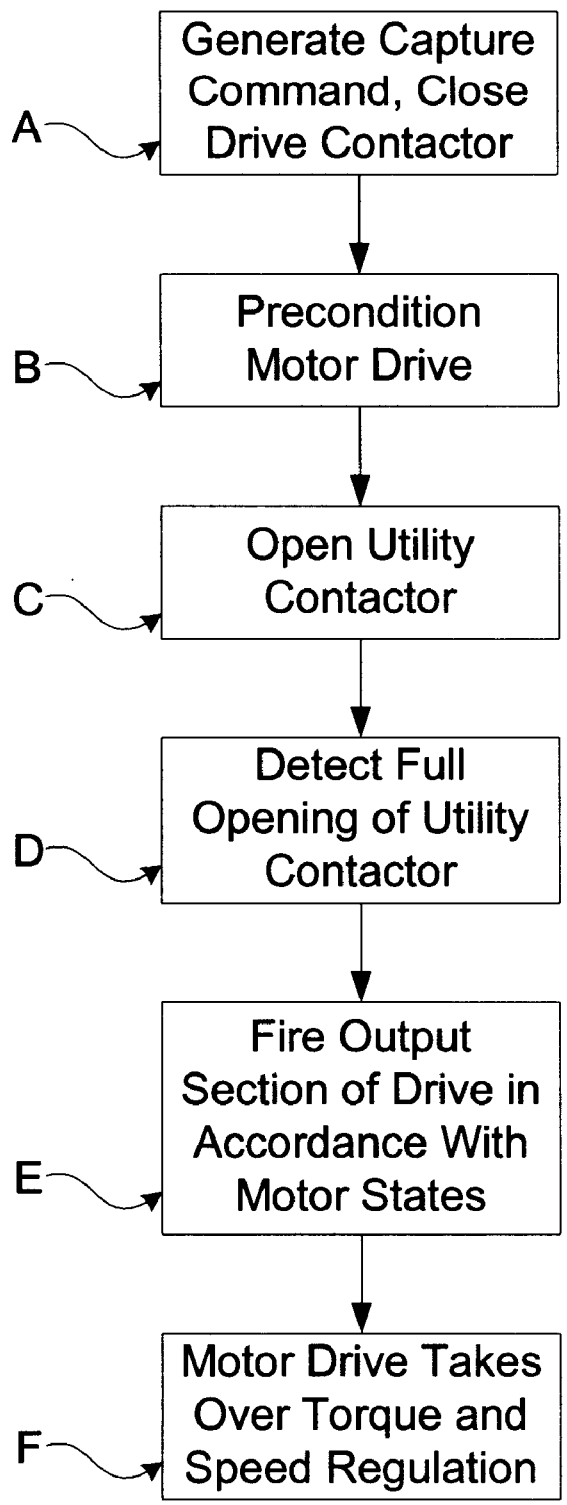
FIG. 5 is a flowchart of a capture procedure of the preferred embodiment.

FIG. 4 is a graph of motor speed versus time during the capture procedure and FIG. 5 is a flowchart of a capture procedure of the preferred embodiment. During the capture procedure, motor 20 is switched from being powered by supply mains 12 to being powered by motor drive 14. To minimize current disturbances, i.e. high or low current values, it is desirable to have the output voltage of motor drive 14 closely match the motor terminal voltage during capture. In the preferred embodiment, various motor states are tracked and motor drive 14 is preconditioned before being energized, i.e. generating an output signal. In step A, at time T1, a capture command is generated by controller 22 and drive contactor 16 is closed while motor drive 14 is in the idle mode, i.e. is not generating an output signal to motor 20. In step B, motor drive 14 begins to be preconditioned as described below. At time T2 in step C, utility contactor 18 is opened by controller 22. The full opening of utility contactor 18 is detected at time T3 in step D. For example, the counter emf of motor 20 can be used to detect opening of contactor 18 or the method described in detail below can be used. At time T4, in step E, output section 64 of motor drive 14 is fired, i.e. switching bridges of output section 64 are gated in a manner to provide a signal to drive motor 20. Motor drive 14 is controlled in accordance with various motor states, as described in detail below, to smoothly capture motor 20. A time T5, in step F, motor drive 14 is controlled to take over torque and speed regulation of motor 20.

Figure 6:
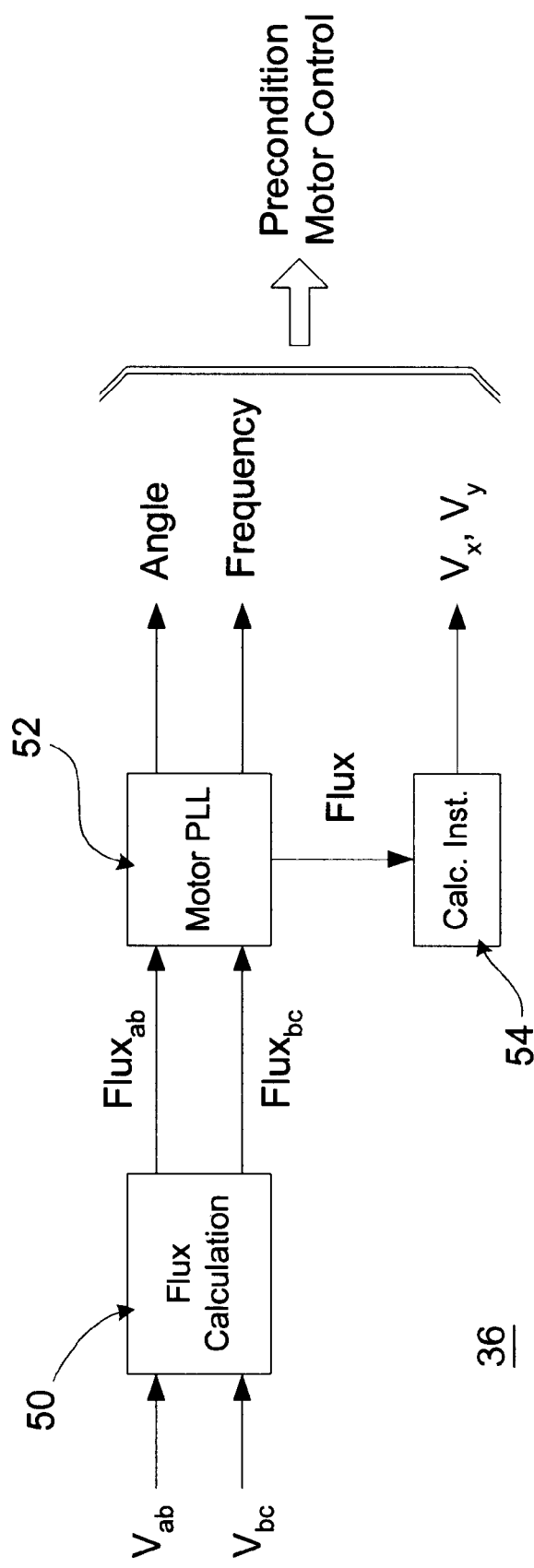
FIG. 6 is a lock diagram of a capture module of the preferred embodiment.

FIG. 6 illustrates capture module 36 of controller 30 which includes instructions for preconditioning and accomplishing the capture procedure. In particular, capture module 36 can be preprogrammed into a memory of controller 30 and can utilize instrumentation in motor drive 14 to detect various motor states. The algorithm of capture module 36 is accomplished beginning at time T2 of FIG. 4 and continues until time T4 when the output section of drive 14 is fired. The algorithm can be accomplished in about 1 millisecond. However, data transfer to complete preconditioning can take several milliseconds. The instantaneous voltage between phase a and phase b (Vab) of motor 20 and the instantaneous voltage between phase b and phase c (Vbc) of motor 20 are detected by instrumentation of motor drive 14 and input into motor flux calculation 50 to determine the flux vector in stator windings of motor 20 due to Vab (Flux_ab) and due to Vbc (Flux_bc) in a known manner. The calculated flux vectors are input into motor flux PLL 52 to determine the angle, frequency, and flux value of the flux vectors. Command voltages, i.e. instantaneous voltages to be applied to terminals of motor 20 for capture, are then calculated by calculation instruction 54 using the following equations:

1) Vx=ωeFlux;and
2) Vy=Flux (R1/L1).

Where:

ωe is the electrical frequency;

R1 is the motor stator winding resistance; and

L1 is the magnetization inductance of the motor.

Figure 7:
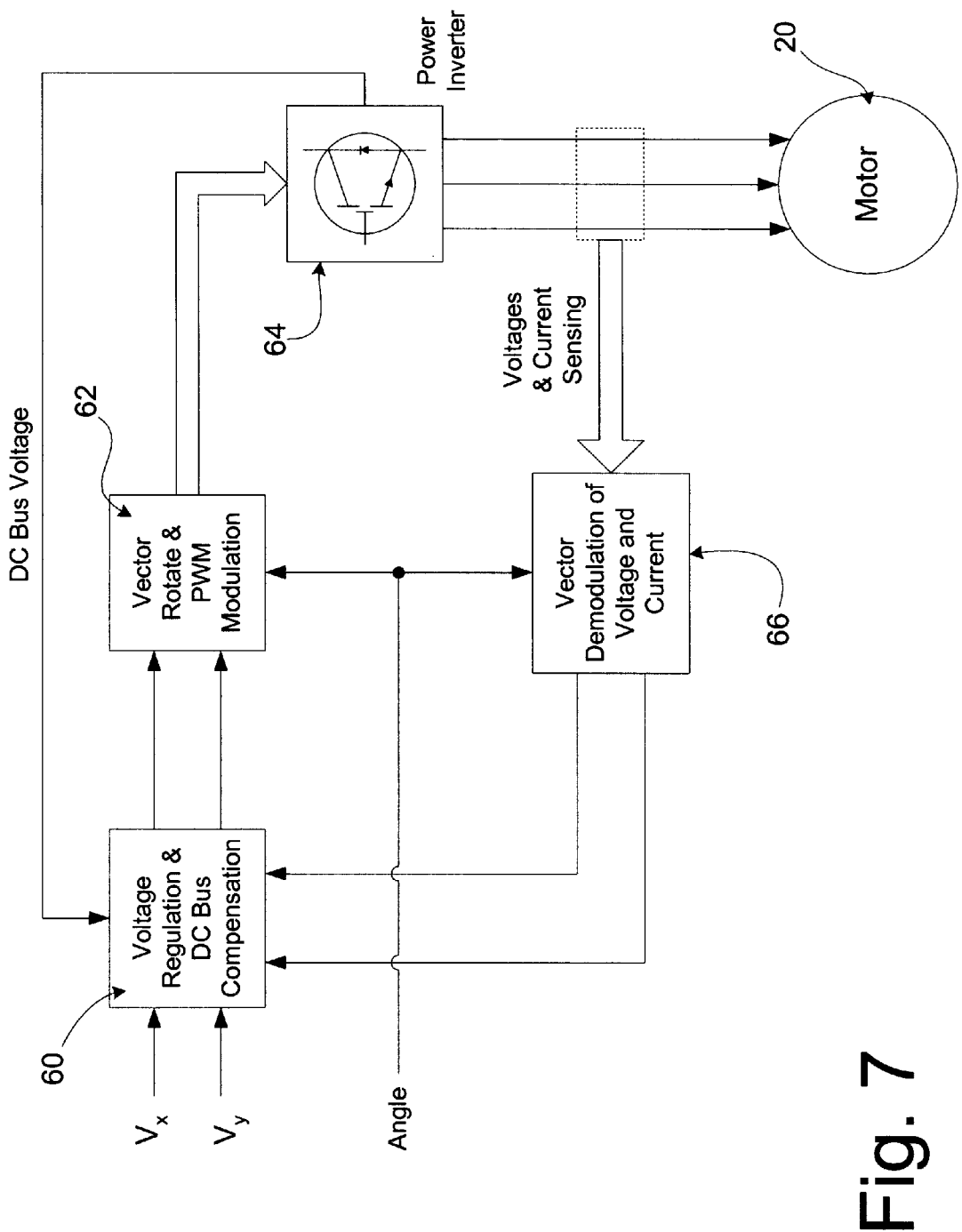
FIG. 7 is a block diagram of the capture control logic of the preferred embodiment.

Controller 30 is then preconditioned using Vx, Vy and the flux angle. As illustrated in FIG. 7, Vx and Vy are input into voltage regulation and DC bus compensation module 60 of controller 30. An output of module 60 is input into vector rotate and pulse width modulation module 62 along with the angle signal to generate gating signals in accordance with the command voltages and the angle. The gating signals are sent to switching bridges of output section 64 to gate the switching bridges to generate a pulse width modulated signal for driving motor 20. The pulse width modulated signal is a variable frequency pulsed voltage signal that induces a sinusoidal current in stator windings of motor 20 to control the torque and speed of motor 20 in a known manner.

Closed loop control is accomplished by sensing the motor voltage and current of each phase, using Hall effect sensors or the like, and demodulating the voltage and current into vector form with demodulation module 66 for feedback into voltage regulation and DC bus compensation module 60. Of course, modulation and demodulation are accomplished in coordination with the angle calculated by motor flux PLL 52.

Figure 8:
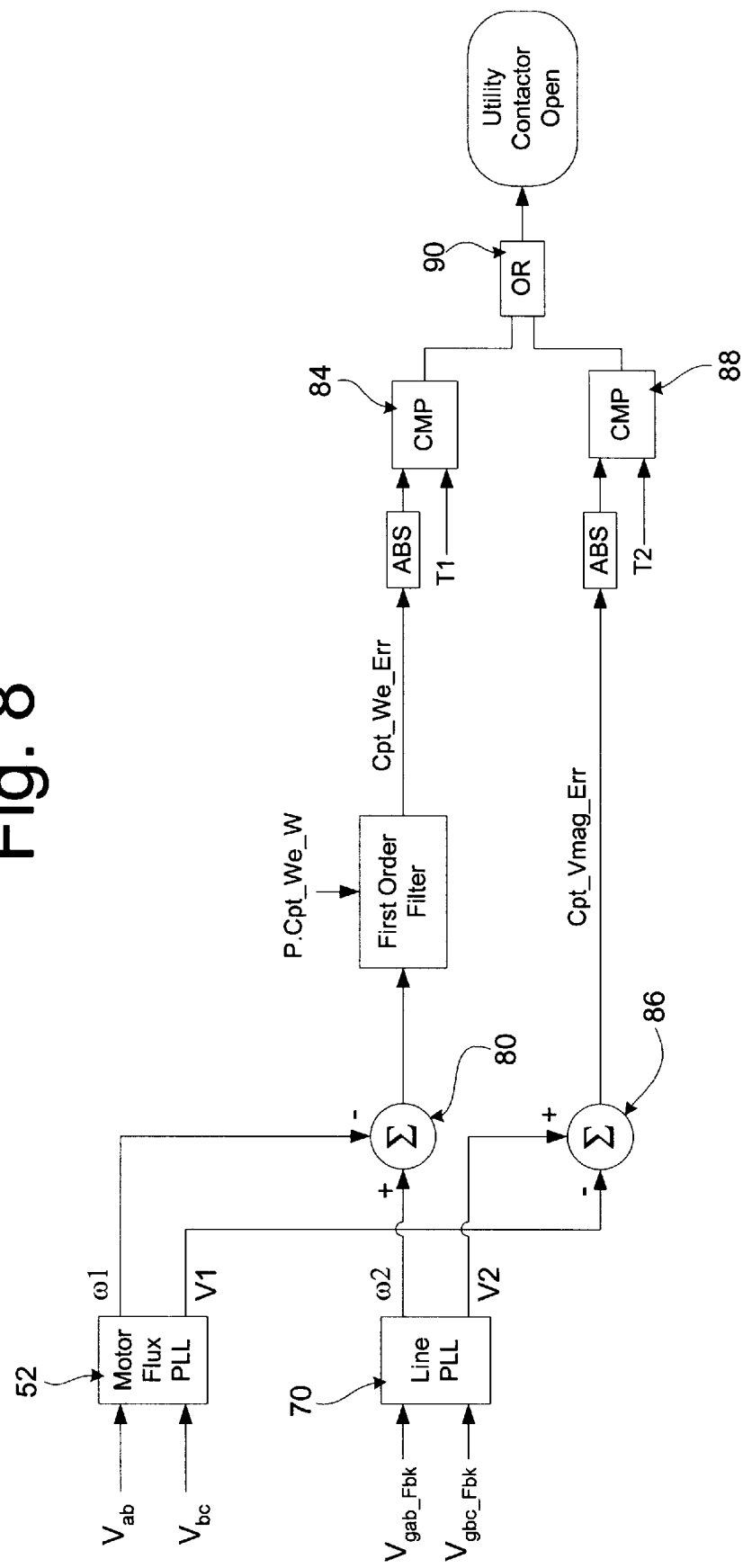
FIG. 8 is a logic diagram of the procedure for detecting opening of the utility contactor of the preferred embodiment.

In step C of FIG., 5, the opening of utility contactor 18 is detected. FIG. 8 illustrates the logic used to affect the detection. The logic of FIG. 8 can be programmed into controller 30 or can be accomplished through separate analog or digital devices. When both contactors 16 and 18 are closed, the frequency and magnitude, i.e. voltage, of line PLL 70 and motor flux PLL 52 are matched. However, when utility contactor 18 opens, the frequency and magnitude of motor flux PLL 52 will begin to drift. Accordingly, the frequency difference between line PLL 70 and motor flux PLL 52 can be used to detect opening of contactor 18. Alternatively, motor flux PLL52 can be sampled and used to compute drift over time to indicate opening of contactor 18. In such a case ω1 is ω1(t) and ω2 can be set to be ω1(t−1)

As illustrated in FIG. 8, the output frequency ω1 of motor flux PLL 52 is subtracted from the output frequency ω2 of line PLL 70 at summing junction 80. The output of summing junction 80 is then filtered by filter 82 to eliminate noise and the output of the filter 82, i.e. the difference between the respective frequencies output by motor flux PLL 52 and line PLL 70, is compared with a predetermined threshold T1 by comparator 84. If the frequency difference is greater than T1, a utility contactor open signal is generated. A delay time can be incorporated into the logic to allow for a full stroke of the contacts in utility contactor 18. The value of T1 can be determined by monitoring operating conditions of motor 20.

When motor 20 has a relatively large inertial load thereon, motor 20 will continue to spin at substantially the same speed after opening of contactor 18. In such a case, the procedure above will be ineffective because the drift in motor flux PLL 52 after opening of utility contactor 18 will be very slow. However, voltage V1 output by motor PLL 52 will collapse at a rate that is independent of the inertial load. Accordingly, the voltage VI output by motor flux PLL 52 is subtracted from the voltage V2 output by line PLL 70, at summing junction 86 and the result is compared with threshold T2 by comparator 88. If the result is greater that T2, the utility contactor open signal is generated. The output of comparators 88 and 84 are input to OR gate 90 so that either condition will generate the utility contactor open signal. In most cases, the frequency comparison is a much faster indicator. However, in the case of large mechanical loads, the voltage comparison will be faster.

It can be seen that the preferred embodiment detects motor states during a capture procedure and preconditions the output of a motor drive to match the terminal voltage of the motor. In this manner, the motor can be captured very quickly after a utility contactor is open. This avoids the current disturbances that are generated in a conventional "make before break" capture while avoiding the time lag and operational abnormalities associated with conventional "break before make" capture procedures. Also, the preferred embodiment allows vector controlled motor drives, or any other drives using control schemes other than volts per hertz, to be applied in transfer applications.

The invention can be applied to any type of drive using vector control or any control scheme other than volts per hertz. Various algorithms can be used to calculate and apply the precondition variables. Any type of switching mechanism can be used, such as contactors, manual switches, solid state switches, or the like. The power supply can be of any type, such as supply mains, a generator, an uninterruptible power supply, or the like. The various modules can be separate hardware or software on can be implemented as a single unit. For example, a single microprocessor based controller can be programmed with the various modules. The preferred embodiment utilizes a motor. However, the invention can be applied to any AC machine.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A transfer method for switching an AC machine from power from a drive to power from a power supply, said method comprising the steps of:
    coupling the output of a drive to an AC machine;
    controlling the AC machine with the output of the drive utilizing a control procedure other than a volts per hertz control procedure;
    sampling electrical frequency of the AC machine;
    freezing voltage output by the drive at a transfer voltage value;
    freezing the frequency output by the drive at a transfer frequency value;
    controlling the output of the drive in accordance with a quasi-voltage mode using the transfer frequency value and the transfer voltage value as a reference;
    synchronizing the output of the drive and the output of a power supply after said controlling step;
    coupling the power supply to the AC machine after said synchronizing step; and
    removing the output of the drive from the AC machine.

2. A method as recited in claim 1, wherein said removing step comprises placing the drive in an idle mode.

3. A method as recited in claim 1, wherein said removing step comprises uncoupling the output of the drive from the AC machine.

4. A method as recited in claim 1, wherein the AC machine is an AC motor.

5. A method as recited in claim 1, wherein the quasi-voltage mode is a voltage follower mode.

6. A method as recited in claim 1, wherein said controlling step of the AC machine utilizes a vector control procedure.

7. A capture method for switching an AC machine from power from a power supply to power from a drive, said method comprising the steps of:
    coupling an output of a power supply to an AC machine to drive the AC machine with the output of the power supply;
    coupling an output of a drive to the AC machine with the drive in an idle state;
    uncoupling the output of the power supply from the AC machine;
    detecting operating states of the AC machine;
    preconditioning the output of the drive to correspond to the operating states detected in said detecting step; and
    controlling the output of the drive based on said preconditioning step.

8. A method as recited in claim 7, wherein said detecting step comprises detecting the instantaneous voltage between phase a and phase b of the AC machine, detecting the instantaneous voltage between phase b and phase c of the AC machine, calculating flux vectors of stator windings of the AC machine based on said detecting steps, wherein said preconditioning step comprises determining the angle, frequency, and flux value of the flux vectors, and calculating command voltages based on the flux value, and wherein said controlling step comprises controlling the output of the drive based on the command voltages.

9. A method as recited in claim 8, wherein said step of calculating the command voltages is accomplished in accordance with the following equations;

$Vx=(\omega e)(Flux)$; and $Vy=Flux\ (R1/L1)$;

where:
    $\omega e$ is the electrical frequency of the motor emf;
    R1 is the stator winding resistance of the AC machine; and
    L1 is the magnetization inductance of the AC machine.

10. A method as recited in claim 7, wherein the AC machine is an AC motor.

11. A method as recited in claim 7, wherein said controlling step comprises controlling the output of the drive using a vector control procedure.

12. A method as recited in claim 7, wherein said step of uncoupling comprises opening a switching mechanism.

13. A method as recite in claim 12, further comprising the step of detecting said opening step prior to said step of detecting operating states.

14. A method as recited in claim 13, wherein said step of detecting said opening step comprises comparing the difference between the frequency at terminals of the AC machine and the frequency of the power supply with a predetermined threshold and generating a signal if the difference exceeds the threshold.

15. A method as recited in claim 13, wherein said step of detecting said opening step comprises comparing the difference between the voltage at terminals of the AC machine and the voltage of the power supply with a predetermined threshold and generating a signal if the difference exceeds the threshold.

16. A method as recited in claim 14, further comprising, determining the frequency at the terminals of the AC machine with a motor PLL of the drive and determining the frequency of the power supply with a line PLL of the drive.

17. A method as recited in claim 15, further comprising, determining the voltage at the terminals of the AC machine with a motor PLL of the drive and determining the voltage of the power supply with a line PLL of the drive.

18. A transfer apparatus for switching an AC machine from power from a drive to power from a power supply comprising:
  means for coupling the output of a drive to an AC machine;
  means for controlling the AC machine with the output of the drive utilizing a control procedure other than a volts per hertz control procedure;
  means for freezing voltage output by the drive at a transfer voltage value;
  means for freezing the frequency output by the drive at a transfer frequency value;
  means for controlling the output of the drive in accordance with a quasi-voltage mode using the transfer frequency value and the transfer voltage value as a reference;
  means for synchronizing the output of the drive and the output of a power supply;
  means for coupling the power supply to the AC machine after said means for synchronizing has synchronized the output of the drive and the output of the power supply; and
  means for removing the output of the drive from the AC machine after said means for coupling has coupled the power supply to the AC machine.

19. An apparatus as recited in claim 18, wherein said means for removing comprises means for placing the drive in an idle mode.

20. An apparatus as recited in claim 18, wherein said means for removing comprises means for uncoupling the output of the drive from the AC machine.

21. An apparatus as recited in claim 18, wherein the AC machine is an AC motor.

22. An apparatus as recited in claim 18, wherein the quasi-voltage mode is a voltage follower mode.

23. An apparatus as recited in claim 18, wherein said means for controlling the AC machine utilizes a vector control procedure.

24. A capture apparatus for switching an AC machine from power from a power supply to power from a drive comprising:
  means for coupling an output of a power supply to an AC machine to drive the AC machine with the output of the power supply;
  means for coupling an output of a drive to the AC machine with the drive in an idle state;
  means for uncoupling the output of the power supply from the AC machine;
  means for detecting operating states of the AC machine;
  means for preconditioning the output of the drive to correspond to the operating states detected by said means for detecting; and
  means for controlling the output of the drive based on an output of said means for preconditioning.

25. An apparatus as recited in claim 24, wherein said means for detecting comprises means for detecting the instantaneous voltage between phase a and phase b of the AC machine, means for detecting the instantaneous voltage between phase b and phase c of the AC machine, means for calculating flux vectors of stator windings of the AC machine, means for determining the angle, frequency, and flux value of the flux vectors, wherein said means for preconditioning comprises means for calculating command voltages based on the flux value, and wherein said means for controlling comprises means for controlling the output of the drive based on the command voltages.

26. An apparatus as recited in claim 25, wherein said means for calculating the command voltages utilizes the following equations;

Vx=(ωe)(Flux); and
Vy=Flux (R1/L1);
where:
  ωe is the electrical frequency of the motor emf;
  R1 is the stator winding resistance of the AC machine; and
  L1 is the magnetization inductance of the AC machine.

27. An apparatus as recited in claim 24, wherein the AC machine is an AC motor.

28. An apparatus as recited in claim 24, wherein said means for controlling comprises means for controlling the output of the drive using a vector control procedure.

29. An apparatus as recited in claim 24, wherein said means for uncoupling comprises means for opening a switching mechanism.

30. An apparatus as recited in claim 29, further comprising means for detecting operation of said means for opening prior to said operation of said means for detecting operating states.

31. An apparatus as recited in claim 30, wherein said means for detecting operation comprises means for comparing the difference between the frequency at terminals of the AC machine and the frequency of the power supply with a predetermined threshold and means for generating a signal if the difference exceeds the threshold.

32. An apparatus as recited in claim 30, wherein said means for detecting operation comprises means for comparing the difference between the voltage at terminals of the AC machine and the voltage of the power supply with a predetermined threshold and means for generating a signal if the difference exceeds the threshold.

33. A method for detecting opening of a switch mechanism in a drive system having a power supply coupled to a drive to provide power to the drive, a first switch mechanism coupled to an output section of the drive, a second switch mechanism coupled to the power supply, an AC machine coupled to the first switch mechanism and the second switch mechanism, and a controller operatively coupled to the first switch mechanism and the second switch mechanism to control the first switch mechanism and the second switch mechanism to selectively couple the AC machine to the utility and the output section of the drive, said method comprising the steps of:
  detecting the frequency at terminals of the AC machine; and generating a first signal indicating the second switch mechanism is open based on said step of detecting the frequency.

34. A method as recited in claim 33, further comprising detecting the voltage at terminals of the AC machine; and generating a second signal indicating the second switch mechanism is open based on said step of detecting the voltage.

35. A method as recited in claim 34, wherein said step of detecting the frequency comprises determining the frequency at the terminals of the AC machine with a motor PLL of the drive.

36. A method as recited in claim 35, wherein said step of detecting the voltage comprises determining the voltage at the terminals of the AC machine with a motor PLL of the drive.

37. A method as recited in claim 33 wherein said step of detecting the frequency comprises comparing the difference between the frequency at terminals of the AC machine and the frequency of the power supply with a first threshold and said generating step comprises generating the signal if the difference is greater then the first threshold.

38. A method as recited in claim 34, wherein said step of detecting the voltage comprises comparing the difference between the voltage at terminals of the AC machine and the voltage of the power supply with a second threshold and said generating step comprises generating the signal of the difference is greater than the second threshold.

39. A method as recited in claim 33, wherein said detecting step comprises sampling the frequency at the terminals of the AC machine and said generating step comprises generating the signal if the sampled frequency changes by a threshold amount over time.

40. A method as recited in claim 34, wherein said detecting step comprises sampling the voltage at the terminals of the AC machine and said generating step comprises generating the signal if the sampled voltage changes by a threshold amount over time.

41. A transfer system for switching an AC machine from power from a drive to power from a power supply, said system comprising:

a power supply;

a drive having an output section and an input section, said input section being coupled to said power supply;

a first switch mechanism coupled to said output section;

a second switch mechanism coupled to said power supply;

an AC machine coupled to said first switch mechanism and said second switch mechanism; and a controller operatively coupled to said first switch mechanism and said second switch mechanism to control said first switch mechanism and said second switch mechanism to selectively couple the AC machine to said power supply and the output section of the drive, said controller being operative to control the speed of the AC machine with the output of the drive when the first switch mechanism is closed and said second switch mechanism is open utilizing a control procedure other than a volts per hertz control procedure, to freeze the voltage output by said drive at a transfer voltage value, and to freeze the frequency output by said drive at a transfer frequency value, said controller also being operative to control the output of said drive in accordance with a quasi-voltage mode using the transfer voltage value and the transfer frequency value as a reference to facilitate synchronizing the output of said drive and the output of said power supply, to close the second switch mechanism to couple said power supply to said AC machine after the output of said drive and the output of said power supply have been synchronized, and the subsequently remove the output of said drive from said AC machine.

42. A capture system for switching an AC machine from power from a power supply to power from a drive, said system comprising:

a power supply;

a drive having an output section and an input section, said input section being coupled to said power supply;

a first switch mechanism coupled to said output section;

a second switch mechanism coupled to said power supply;

an AC machine coupled to said first switch mechanism and said second switch mechanism; and a controller operatively coupled to said first switch mechanism and said second switch mechanism to control said first switch mechanism and said second switch mechanism to selectively couple said AC machine to said power supply and said output section of said drive, said controller being operative to close said second switch mechanism to couple an output of said power supply to the AC machine to drive said AC machine with the output of said power supply and close said first switch mechanism to couple an output of said drive to said AC machine with said drive in an idle state, said controller also being operative to open said second switch mechanism to uncouple the output of said power supply from said AC machine, to detect operating states of said AC machine, to precondition the output of said drive to correspond to the detected operating states and to control the output of said drive based on the preconditioning.

43. A method for detecting opening of a switch mechanism in a drive system having a power supply coupled to a drive to provide power to the drive, a first switch mechanism coupled to an output section of the drive, a second switch mechanism coupled to the power supply, an AC machine coupled to the first switch mechanism and the second switch mechanism, and a controller operatively coupled to the first switch mechanism and the second switch mechanism to control the first switch mechanism and the second switch mechanism to selectively couple the AC machine to the power supply and the output section of the drive, said method comprising the steps of:

detecting the voltage at terminals of the AC machine;

and generating a first signal indicating the second switch mechanism is open based on said step of detecting the voltage.

44. A method as recited in claim 43, further comprising detecting the frequency at terminals of the AC machine; and generating a second signal indicating the second switch mechanism is open based on said step of detecting the frequency.

* * * * *